No. 753,403. PATENTED MAR. 1, 1904.
G. W. KENNARD.
LOCK FOR SCREW OR BOLT HEADS.
APPLICATION FILED JAN. 9, 1903.
NO MODEL.
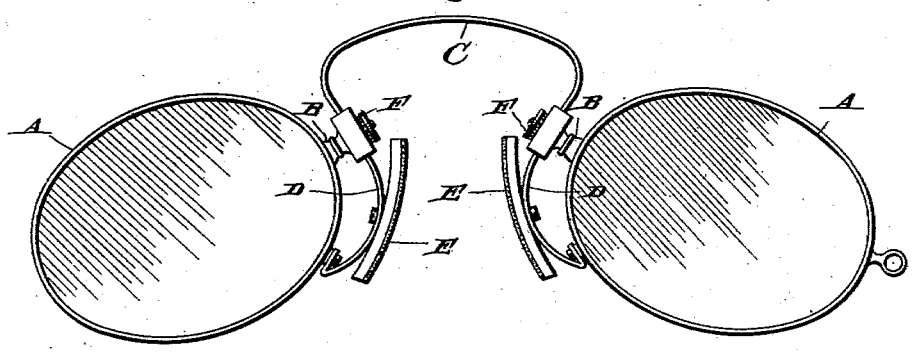
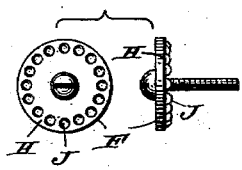
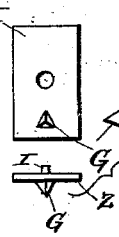
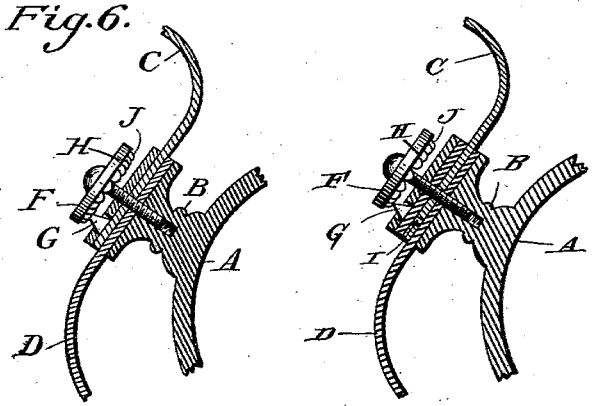
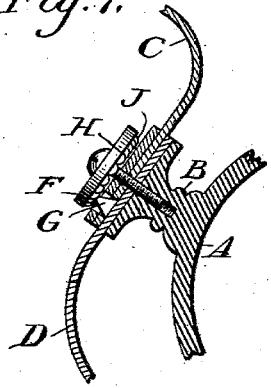
Witnesses:
M. J. Payne
J. H. Jackson
Inventor:
George W. Kennard No. 753,403. Patented March 1, 1904.

UNITED STATES PATENT OFFICE.

GEORGE W. KENNARD, OF STAUNTON, VIRGINIA.

LOCK FOR SCREW OR BOLT HEADS.

SPECIFICATION forming part of Letters Patent No. 753,403, dated March 1, 1904.

Application filed January 9, 1903. Serial No. 138,366. (No model.)

*To all whom it may concern:*

Be it known that I, GEORGE W. KENNARD, a citizen of the United States, residing at Staunton, in the county of Augusta, in the State of Virginia, have invented certain new and useful Improvements in Locks for Screw or Bolt Heads, and more particularly used to prevent the spring and nose-guard of the eyeglass-frame from becoming accidentally loosened. I accomplish this by so fastening the screw used to retain the said parts as to prevent said screw when normally placed from turning; and I do hereby declare the following to be a full, clear, and exact description of my invention, such as will enable others skilled in the art to which it appertains to make and use my said invention. I attain this important object by the device illustrated by the accompanying drawings, in which—

Figure 1 is a view of an ordinary eyeglass-frame. Fig. 2 illustrates the pin mounted on the nose-guard. Fig. 3 illustrates the pin mounted on the washer I employ, two views being shown in detail and designated Y and Z, respectively. Fig. 4 shows a top and side view of the screw I employ. Fig. 5 is a sectional view in which the composing parts are assembled and the screw is shown ready to be fastened in place. Fig. 6 illustrates the pin mounted on the spring of the eyeglass-frame. Fig. 7 illustrates the pin mounted on the nose-guard of the eyeglass-frame.

Referring to the drawings that they may be better understood, it is necessary to describe the essential parts in detail, letters being used to designate the parts referred to in the drawings.

In Fig. 1 A represents the lens-frame, having mounted thereon a stud B, said stud having on its free surface a suitable face to receive spring C and nose-guard D and also having a screw-hole to receive screw F in order to secure said spring and nose-guard to the said stud. Mounted, preferably, on the nose-guard D is a pin G, intended to engage in a suitable depression on the under or contact surface of the screw-head F.

Fig. 2 illustrates more particularly the pin G. In this figure the pin G is shown mounted on the end of the nose-guard D, on which I preferably mount the said pin G. I wish it distinctly understood, however, that the pin G may be mounted on either the nose-guard D or on the spring C or on the stud B.

Fig. 3 illustrates the pin G mounted on the washer I employ. Drawing Y is a detail view of said washer, the pin G being shown on one side and on the other side a projection I being shown and intended to engage in a hole or slot purposely made in either the nose-guard D or the spring C, and thereby act substantially as if the pin was mounted on the nose-guard D. This is more applicable to the repair of old eyeglasses. In this figure the detail view Z shows pin G and projection I in order to better understand their form and the method of mounting said pin and projection.

Fig. 4 shows screw F having a circular head, with a suitable slot to engage any suitable tool employed to fasten said screw in place. On the under or contact face of the screw-head are a series of radial elevations intermediate of the periphery and center of the said screw-head and having intervening depressions, it being intended that pin G should engage in one of the said depressions when screw F is normally placed, and thereby prevent said screw from accidentally turning, but allowing the said screw to be placed and replaced at will. In this figure, H is the elevation, and J is the intervening depression.

In making the screw I employ metal for the screw-head of proper temper to allow said screw-head to have the quality and function of a spring, and thus the screw may be placed and replaced as often as required, as I have repeatedly demonstrated. In making the elevations on the contact-face of the screw-head I employ a punch, and it being applied to the upper face of the screw-head makes the elevation on the contact-face of the said screw-head. However, any mechanical means may be employed having in view the same principle, but differing in form or method and accomplishing the same result.

Fig. 5 shows the composing parts assembled, with screw F in place and ready to be securely fastened. The pin G is illustrated as about to engage in the depression J between the elevations H, and thereby secure screw F against accidentally rotating. In this way I prevent the frequent loosening of the connection of the composing parts of the eyeglass-frame.

This invention may receive various modifications, the essential principle, however, being to place the pin G on the surface of the eyeglass-frame immediately in contact with the contact-face of the screw-head. It must be distinctly understood, therefore, that the order in which the parts of the eyeglass-frame are placed on the stud B is entirely immaterial, so far as the construction of the eyeglass-frame is concerned.

It is pointed out and distinctly shown in the drawings, that this invention may receive several modifications, two separate modifications being shown in the following figures— viz., 6 and 7—and more particularly pointed out in the claims.

Fig. 6, a detail view, illustrates the composing parts of the eyeglass-frame assembled. The pin G is shown as located on the spring C, the screw F is illustrated in place, and the pin G engaging in the depression J between the elevations H.

Fig. 7, a detail view, illustrates the pin G located on the nose-guard D, the composing parts of the eyeglass-frame assembled, with screw F in place and pin G engaging in the depression J between the elevations H.

Having thus described my invention, I claim—

1. The combination in an eyeglass-frame, of a screw, with that part of the screw-head intermediate of the periphery and center having the temper and function of a spring, said screw-head provided also on the contact-face, with a plurality of radial elevations and depressions, with locking means located on the surface of the eyeglass-frame immediately in contact with the contact-face of the screw-head, said locking means engaging a depression on the contact-face of the said screw-head, substantially as set forth.

2. The combination in an eyeglass-frame, of a screw and a locking-pin, with that part of the screw-head intermediate of the periphery and center having the temper and functions of a spring, said screw-head provided also on the contact-face with a plurality of radial elevations and depressions, and said locking-pin located on the surface of the eyeglass-frame immediately in contact with the contact-face of the said screw-head, said pin engaging a depression on the contact-face of the said screw-head, substantially as, and for the purpose set forth.

3. The combination in an eyeglass-frame of a screw and a washer, said screw having provided on the contact-face of the screw-head a plurality of radial elevations and depressions, said washer provided on one side with locking means engaging a depression on the contact-face of the screw-head, and on the other side locking means engaging the part of the eyeglass-frame immediately in contact with the said washer, substantially as, and for the purpose set forth.

4. The combination in an eyeglass-frame of a screw and a washer, with that part of the screw-head intermediate of the periphery and center, having the temper and function of a spring, said screw provided also on the contact-face with a plurality of radial elevations and depressions, said washer provided on one side with locking means engaging a depression on the contact-face of the screw-head, and on the other side locking means engaging the part of the eyeglass-frame immediately in contact with the said washer, substantially as, and for the purpose set forth.

GEORGE W. KENNARD.

Witnesses:
J. N. JACKSON,
M. J. PAYNE.